United States Patent [19]

Carey et al.

[11] Patent Number: 4,979,772
[45] Date of Patent: Dec. 25, 1990

[54] APPARATUS FOR PROTECTING INTERIOR FLOOR COVERING OF A VEHICLE

[76] Inventors: Thomas C. Carey, 29843 Richland, Livonia, Mich. 48150; David L. Kalanik, 11410 Grayfield, Redford, Mich. 48239

[21] Appl. No.: 479,990
[22] Filed: Feb. 14, 1990
[51] Int. Cl.[5] ............................................. B60N 3/04
[52] U.S. Cl. .................................... 296/39.1; 296/66; 296/69; 296/97.23
[58] Field of Search .................. 296/39.1, 97.23, 37.16, 296/66, 69

[56] References Cited

U.S. PATENT DOCUMENTS

| | | | |
|---|---|---|---|
| 2,898,146 | 8/1959 | Yudenfreund | 296/39.1 |
| 4,443,034 | 4/1984 | Beggs | 296/37.16 X |
| 4,481,240 | 11/1984 | Roth | 296/97.23 X |
| 4,588,628 | 5/1986 | Roth | 296/97.23 X |
| 4,848,826 | 7/1989 | Kuwabara et al. | 296/97.23 |

Primary Examiner—Dennis H. Pedder
Assistant Examiner—Andrew C. Pike
Attorney, Agent, or Firm—Harness, Dickey & Pierce

[57] ABSTRACT

A liner assembly for protecting the interior covering located in the rear cargo area of a vehicle having a foldable rear seat. The linear assembly protects the interior covering from being soiled or damaged from transporting cargo placed in the rear cargo area. The liner assembly includes a first liner member adapted to cover the cargo area rearward of the rear seat. A second liner member is pivotally connected to the first liner member and is adapted to cover at least a portion of a rear surface of the foldable rear seat which is adjacent the cargo area. A third liner member is removably attached to the rear seat surface in overlapping sliding relation to the second liner member to cover any remaining portion of the rear seat surface.

9 Claims, 2 Drawing Sheets

APPARATUS FOR PROTECTING INTERIOR FLOOR COVERING OF A VEHICLE

BACKGROUND OF THE INVENTION

1. Field of the Invention

The present invention relates to an apparatus for protecting interior coverings in the load carrying area of a vehicle and, more particularly, to a pivotally moveable protective liner device for "multi-purpose" vehicles.

2. Discussion

As a customer convenience feature, many motor vehicles are equipped with foldable rear seats which allow the vehicle operator to increase the vehicle's cargo carrying capacity. Typically, foldable rear seats are provided in combined passenger and cargo carrying vehicles commonly referred to as "Station Wagons" or, more generically, as "multi-purpose" vehicles. When the rear seat is folded into a relatively horizontal orientation, the seat back and any floor extension panels hinged to the seat back are arranged to become a part of the load carrying area of the vehicle.

Because of their recent popularity, automobile manufacturers have been outfitting their "mutli-purpose" vehicles with decorative interior floor coverings in the load carrying area, including color-coordinated carpeting.

It has become common practice to utilize such "multi-purpose" vehicles for combined commercial and recreational use. Unfortunately, interior floor coverings (i.e. carpet) and the back surface of the foldable rear seat are easily soiled, scuffed, and/or damaged during transport of cargo within the rear load carrying area. With the ever rising cost of these "multi-purpose" vehicles it is necessary to protect interior coverings to inhibit premature soiling and degradation generally associated with routine cargo transport activities. Likewise, replacement of damaged interior floor coverings and/or seat coverings is undesirable due to the expense and inconvenience for the vehicle owner.

Accordingly, it is an object of the present invention to provide an apparatus for protecting interior coverings in the rear load carrying area of a vehicle equipped with a foldable rear seat assembly.

Additionally, it is another object of this invention to provide a protective apparatus which is quickly installed and easy to operate. The apparatus is fabricated from durable and sturdy materials which can be economically manufactured. Likewise, it is an object of the invention for the protective apparatus to be readily removable from the rear load carrying area of a vehicle when protection of interior coverings is not required. It is also contemplated that the protective apparatus will be aesthetically pleasing to the vehicle owner, since it can be readily fabricated from color-coordinated materials and configured to mate with the contour of the particular vehicle.

BRIEF DESCRIPTION OF THE DRAWINGS

Various advantages of the present apparatus will become apparent to one skilled in the art upon reading the following detailed description and by reference to the following drawings in which.

DETAILED DESCRIPTION OF THE PREFERRED EMBODIMENT

Figure 1:
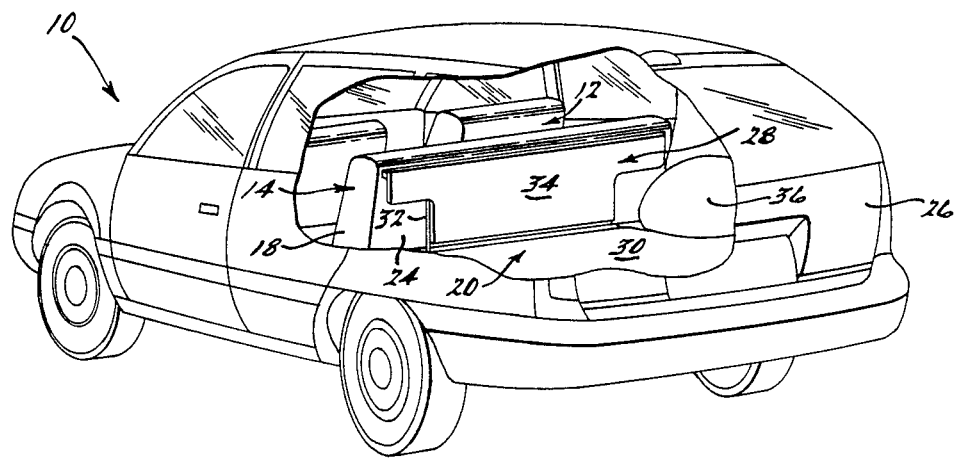
FIG. 1 is a perspective view of a representative vehicle, partially broken away, having a foldable rear seat and illustrated in operative association with a protective liner apparatus according to the preferred embodiment of the present invention.
Figure 2:
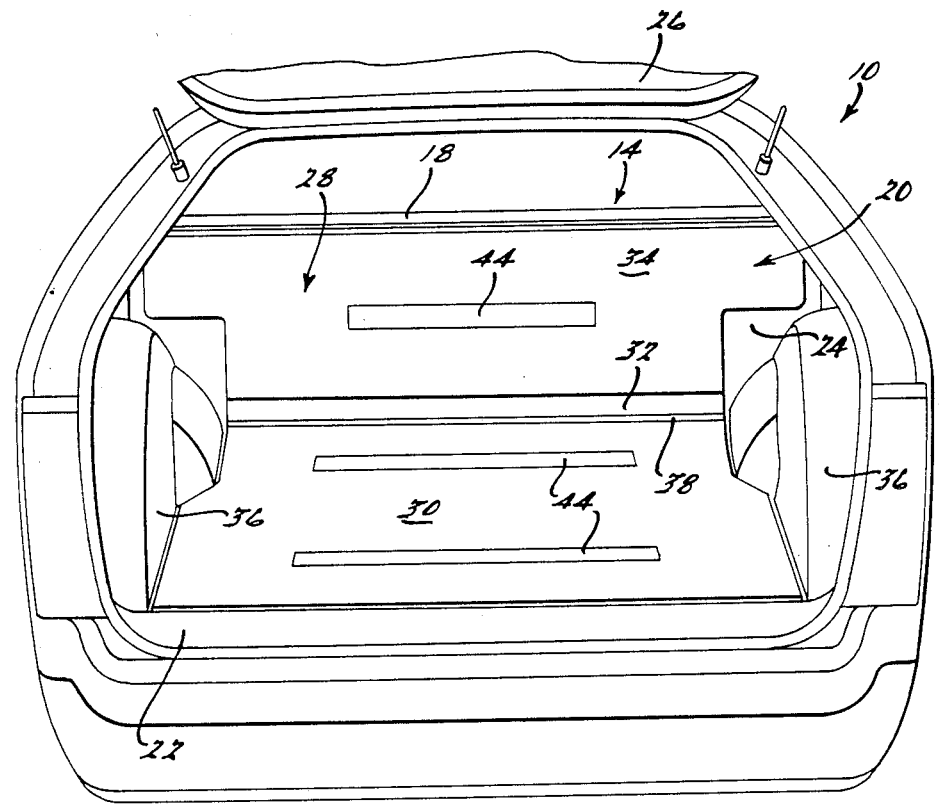
FIG. 2 is a perspective view of a vehicle with its rear tailgate open illustrating the protective liner apparatus in operative association therein.

Referring now to the drawings, and more particularly to FIGS. 1 and 2, a "multi-purpose" vehicle is shown and is generally designated by reference numeral 10. "Multi-purpose" vehicle 10 generically defines all motor vehicles that are designed to provide a rear cargo carrying area in addition to a passenger carrying area in the front of the vehicle. Vehicle 10 includes a front seat assembly 12 and a rear seat assembly 14. Rear seat assembly 14 includes a seat cushion 16 and a seat back 18 pivotally secured thereto which is capable of pivotally moving from a generally vertical (upright) to a horizontal (folded) position. The area rearward of rear seat assembly 14 defines the cargo carrying area 20 of vehicle 10 and which includes a flat load carrying floor or deck 22 which is normally elevated above the floor pan associated with the front portion of the passenger area.

Seat back 18 pivotally folds over to a position where its backside surface 24 forms a continuation of the generally horizontal cargo carrying deck 22. In this manner, vehicle 10 defines cargo storage area 20 which extends between tailgate 26 and the back surface of front seat 12.

Figure 3:
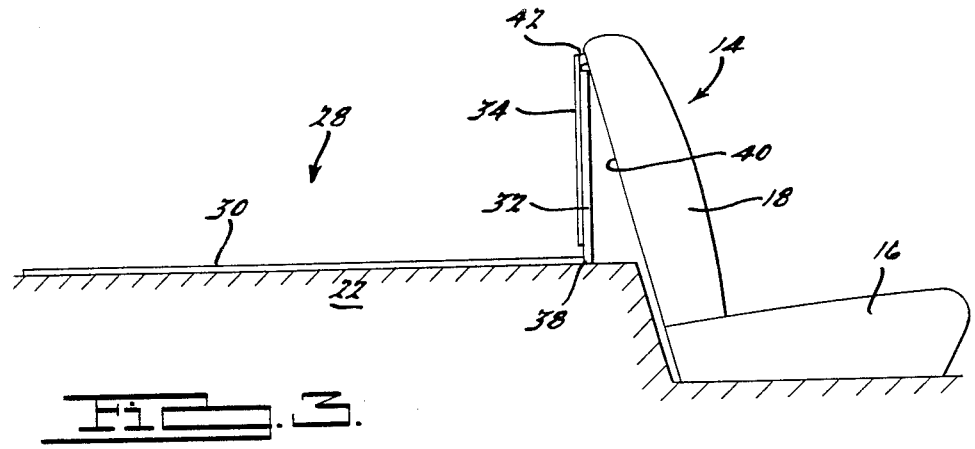
FIG. 3 is a diagrammatical side view showing the protective liner apparatus in operative association with a foldable rear seat positioned in a vertical position.
Figure 4:
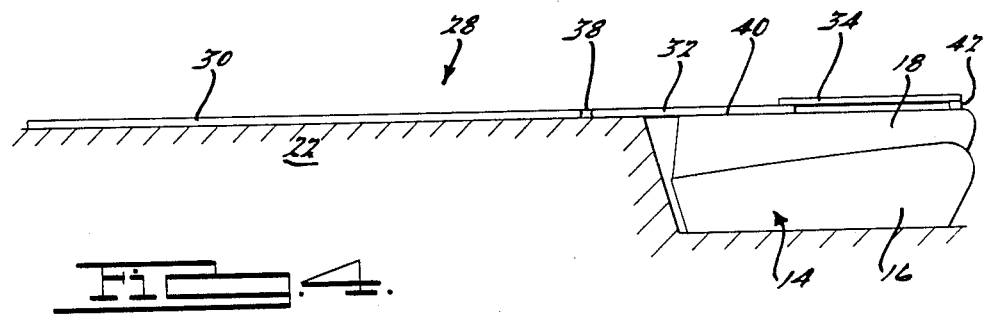
FIG. 4 is a similar to FIG. 3 except the foldable seat is illustrated in a horizontal position.
Figure 5:
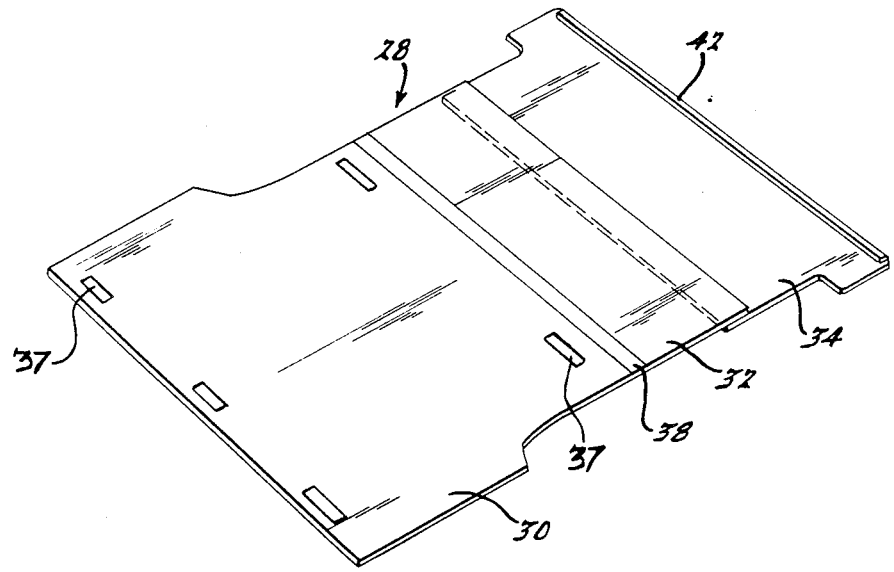
FIG. 5 is a perspective view of the underside of the protective liner apparatus according to the present invention.

According to the preferred embodiment of the present invention, internal coverings, such as carpet, color-coordinated floor panels, or the like are provided by the vehicle manufacturers on deck 22 and are protected from damage by a liner assembly 28. Moreover, liner assembly 28 protects the backside surface 24 of rear seat back 18 from being torn or otherwise damaged. As is apparent from reference to FIGS. 3 through 5, liner assembly 28 includes three relatively thin planar liner members 30, 32, and 34, respectively. Preferably, each liner member is fabricated from a relatively rigid and abrasion resistant material. More preferably, each liner member is fabricated from a relatively thin semi-rigid plastic material having a thickness of about 0.060" and which is resistant to scuffing while providing frictional support against sliding movement of cargo carried thereon. While the preferred material is an A.B.S. plastic, any material providing the suitable characteristic is applicable.

Liner assembly 28 comprises first liner member 30 which is configured to contiguously cover a substantial portion of deck 22 when rear seat back 18 is locked in its upright position. Preferably, first liner member 30 is configured to be closely fitted to the peripheral boundaries provided by the side walls and the inwardly projecting wheel wells 36. First liner member 30 is maintained in removably fixed engagement with deck 22 via suitable means for attachment thereto. More specifically, VELCRO hook and loop fasteners 37 can be provided on the underside of first liner member 30 which are securable to the floor covering provided on deck 22. However, it should be understood that any suitable means for removably securing first liner member 30 to deck 22 is contemplated. Alternatively, attachment means may not be necessary in those vehicular applications where the configuration of the peripheral boundaries acts to restrict first liner member 30 from sliding movement.

Second liner member 32 is secured to one end of first liner member 30 for pivotal movement relative thereto. More specifically, second liner member 32 is secured to first liner member 30 via a hinge 38. Preferably, hinge 38 joins first liner member 30 and second liner member 32 in generally abutting relationship substantially across the entire width thereof so as to maintain a generally planar horizontal orientation across the entire width of deck 22 when seat back 18 is pivoted to the folded position shown in FIG. 4. Hinge 38 is secured to the underside surface of first liner member 30 and second liner member 32 to maintain a substantially flat and continuous protective assembly when seat back 18 is horizontally positioned. It is to be understood that any pivoting device known to those skilled in the art for providing a pivotable joint is within the scope of the present invention.

Third liner member 34 is provided in overlapping sliding relationship relative to second liner member 32. More specifically, third liner member 34 is removably secured to an upper portion of a back surface 40 of seat back 18 by suitable means such as a VELCRO attachment 42. Such overlapping relationship allows rear seat assembly 14 to be pivotally rotated from a generally vertical "upright" position to a generally horizontally "folded" orientation without the undesirable sliding movement of first liner member 30 and without uncovering any portion of deck 22 and surface 40 of seat back 18. In this manner, a substantial portion of deck 22 is protectively covered regardless of the angular orientation of rear seat back 18. Again, it is to be understood that any suitable means for removably attaching third liner member 34 to surface 40 of seat back 18 is within the scope of this invention.

As previously described, the material of choice should provide resistance against scuffing and marring and should also provide a frictionally engaging top surface to inhibit sliding movement of cargo during operation of vehicle 10. To assist in limiting excessive sliding of cargo, the present invention may include relatively thin and textured "frictional" tape strips 44 which can be attached to any of the liner members.

Liner assembly 28 may be easily removed from deck surface 22 and a rear seat back 18 by detaching first member 30 from deck 22 and third liner member 34 from rear seat back 18. Upon removal, liner assembly 28 may be folded together and stored as a unit. In this manner, the interior coverings surrounding the load carrying area of multi-purpose vehicle 10 are protected against being soiled, scuffed, and/or torn during transport of cargo.

It should be understood that the term "cargo" is meant to be non-limiting in scope and include anything which can be readily transported within the vehicle's rear area. Likewise, while the multi-purpose vehicle is illustrated as having a stationary seat cushion 16, it is to be understood that any foldable rear seat assembly which provides for an extended rear cargo storage area within the vehicle is within the fair meaning of the present invention.

Those skilled in the art can appreciate that other advantages can be obtained from the use of this invention and that modification can be made without departing from the true spirit of the invention after studying the specification, drawings and the following claims.

What is claimed is:

1. An apparatus for protecting interior coverings in a cargo carrying area of a vehicle having a foldable rear seat back member, said apparatus comprising:
   a first liner member configured to cover a generally flat deck surface of said cargo carrying area rearward of said rear seat back;
   a second liner member configured to cover at least a portion of a rearward surface of said rear seat back adjacent said cargo carrying area;
   pivot means interconnecting said first and second liner members for permitting said second liner member to pivot with said rear seat back from a generally vertical position to a generally horizontal position;
   a third liner member in overlapping sliding relation to said second liner member configured to cover any remaining portion of said rearward surface of said rear seat back; and
   first attachment means for removably attaching said third liner member to said rearward surface of said rear seat back.

2. The apparatus of claim 1 wherein said first, second, and third liner members are fabricated from a relativeely thin, semi-rigid planar material.

3. The apparatus of claim 2 wherein said pivot means comprises a hinge device acting to attach said first and second liner members in generally abutting relation while permitting said second liner member to pivot relative to said first liner member upon pivotal movement of said foldable rear seat back.

4. The apparatus of claim 3 wherein said hinge device is a hinge strip for securing said first and second liner members, said hinge strip provided substantially across an entire width of said liner members.

5. The apparatus of claim 1 further comprising second attachment means for removably attaching said first liner member to said generally flat deck surface of said cargo carrying area.

6. The apparatus of claim 5 wherein said first and second attachment means include at least one hook and loop fastener tab secured to the respective liner menber thereof and engageable with interior coverings in said cargo carrying area for releasably securing said liner members to said interior coverings.

7. The apparatus of claim 1 further comprising frictional means associated with an upper surface of said liner members for inhibiting sliding movement of cargo resting thereon during operation of said vehicle.

8. The apparatus of claim 7 wherein said frictional means comprises at least one relatively thin strip of a second material mounted on said upper surface of at least one of said liner members, said second material engageable with said cargo to inhibit excessive sliding movement thereof.

9. The apparatus of claim 1 wherein said first liner member is configured to closely fit to peripheral boundaries provided by side walls of said vehicle and said third liner member is configured to protect a substantial portion of said rearward surface of said rear seat back.

* * * * *